March 23, 1965  E. A. VON SEGGERN ETAL  3,174,470
EXCESS AIR CYCLE ENGINE AND FUEL SUPPLY MEANS
Filed June 14, 1963  2 Sheets-Sheet 1

ERNEST A. VON SEGGERN.
HENRY E. VON SEGGERN
INVENTORS

BY

ATTORNEY

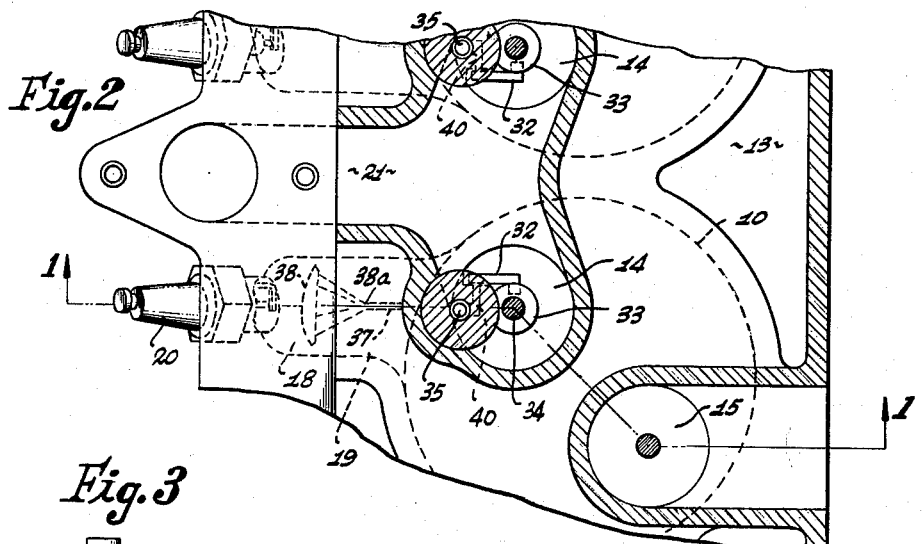
Fig. 2
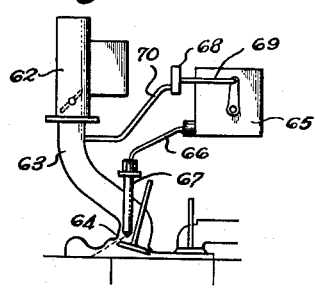
Fig. 3
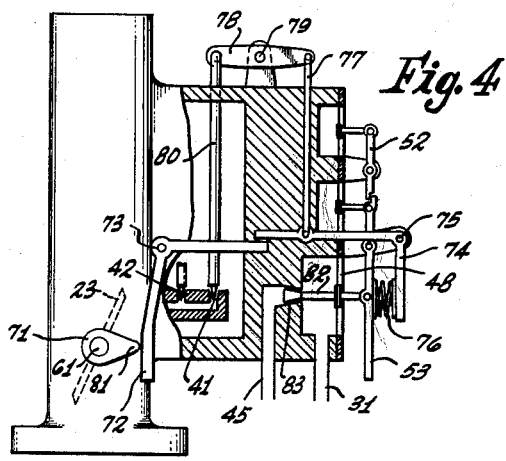
Fig. 4
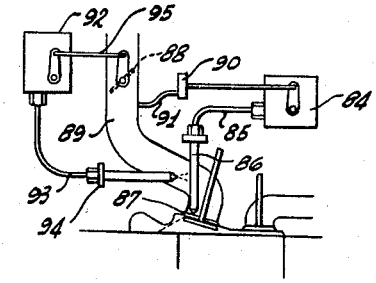
Fig. 5
ERNEST A. VON SEGGERN
HENRY E. VON SEGGERN
INVENTORS
BY 
ATTORNEY United States Patent Office 3,174,470
Patented Mar. 23, 1965

3,174,470
EXCESS AIR CYCLE ENGINE AND FUEL
SUPPLY MEANS
Ernest A. von Seggern, 1051 E. Angeleno, Burbank, Calif.,
and Henry E. von Seggern, Rte. 2, Box 1910, Escondido,
Calif.
Filed June 14, 1963, Ser. No. 288,033
17 Claims. (Cl. 123—127)

This invention relates to an excess air cycle engine of the type having means to localize an ignition charge, and fuel supply means therefor. In particular it relates to an engine of this class illustrated by the second form (FIGS. 3 and 4) of excess air cycle engine disclosed in our copending application Serial No. 278,383 filed May 6, 1963, and entitled Excess Air Cycle Engine. The subject matter of said application is incorporated herein by this reference. Engines of this class have a combustion chamber and a separate ignition chamber and a single intake valve into the combustion chamber. The fuel supply means disclosed herein is a particular form of the more general fuel supply means illustrated and disclosed in our copending application Serial No. 283,089 filed May 24, 1963, and entitled Dual Fuel Supply Means for Excess Air Cycle Engine. The subject matter of said application is also incorporated herein by this reference.

It is a general object of the invention to provide a fuel supply means and excess air cycle engine which is suitable for light fuels such as gasoline, and operates with a clean, odorless and non-smog producing combustion.

More specific objects include the provision of an excess air cycle engine and fuel supply means which is structurally very similar to a standard gasoline engine, duplicates the performance associated therewith, and also has better part-load fuel economy.

Other general objects and features of the invention as well as special objects and features will be described in the specification in conjunction with the description of the specific forms shown herein.

The engine and fuel supply means which attains the aforesaid objects consists essentially of a conventional engine and carburetor, but the combustion chamber of said engine includes a separate ignition chamber, and the carburetor includes an auxiliary fuel supply means which delivers part of the fuel to the ignition chamber independently of the carbureted fuel supply. By this means a stoichiometric fuel-air mixture is provided in the ignition chamber, while the carburetor delivers a lean mixture to the combustion chamber.

Additional features of the invention will be described in conjunction with a description of the engine and associated fuel supply means, and the mode of operation. In the accompanying drawings showing a typical illustrative embodiment of the broad invention:

FIG. 2 is a horizontal section of the engine taken along the broken line 2—2 of FIG. 1;

FIG. 3 is a diagrammatic view of alternate means for supplying the auxiliary fuel;

FIG. 4 is a diagrammatic view of means for varying the degree of leanness in the combustion chamber as a function of engine load; and FIG. 5 is a diagrammatic view of an alternate means for supplying the fuel, using fuel pumps.

Figure 1:
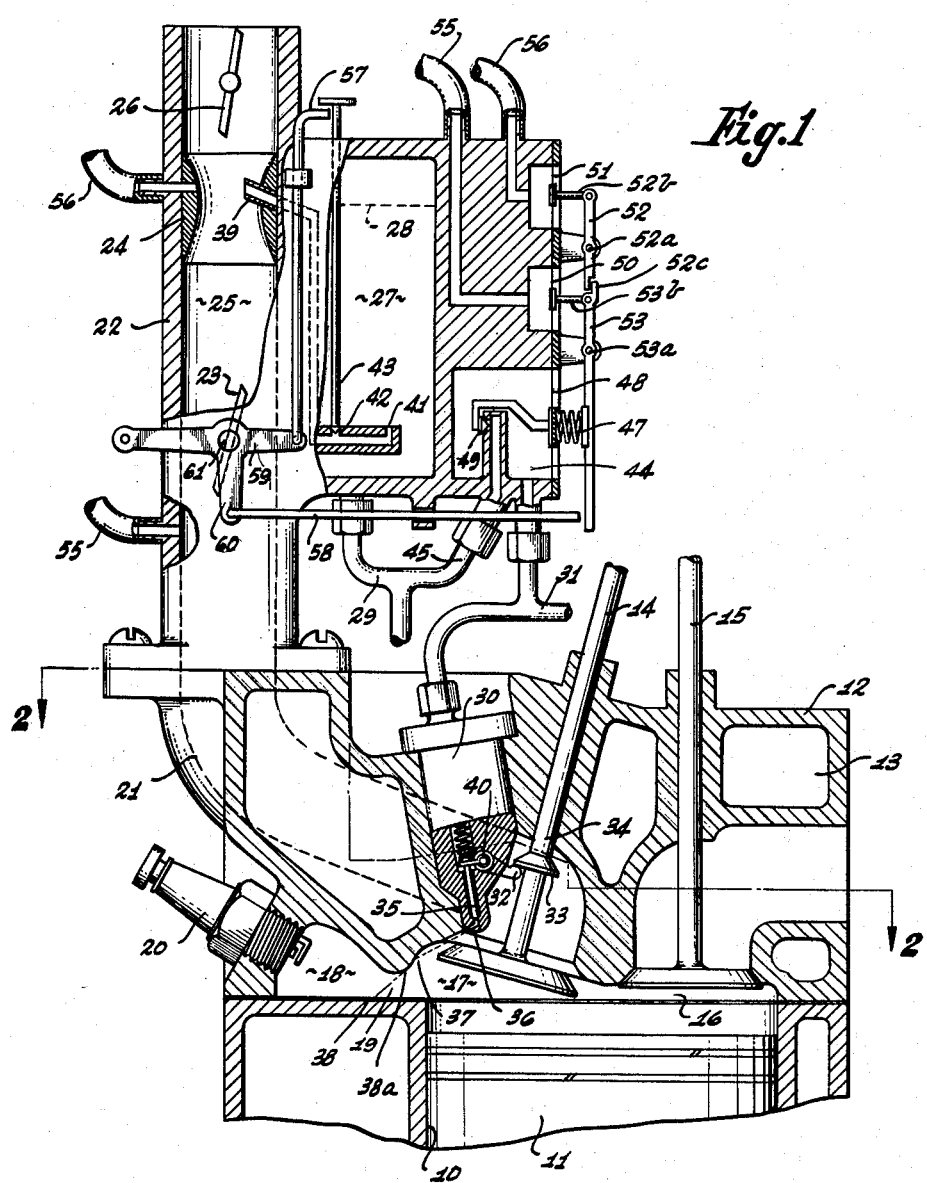
FIG. 1 is a vertical section of the engine and fuel supply means, taken along the broken line 1—1 of FIG. 2.

The engine is shown as a typical four cylinder water-cooled, valve-in-head design, but it is evident that other arrangements and types of cooling could be employed, and the fuel supply means is shown as a typical down draft carburetor although vertical or horizontal draft forms could be used. In FIGS. 1 and 2, a cylinder 10 has a piston 11 therein, and has a cylinder head 12 fastened onto the upper end. Both cylinder 10 and cylinder head 12 are water cooled by means of jacket 13. An inlet valve 14 and an exhaust valve 15 are located in head 12 above said cylinder and are operated in the conventional manner by the usual mechanism (not shown).

Formed within head 12 is the main combustion chamber 16 which has an enlarged wedge-shaped portion 17 below the inclined intake valve 14. The ignition chamber 18 is located adjacent said enlarged portion 17 and is connected thereto by a short large passage 19. A spark plug 20 is screwed into the ignition chamber. An intake manifold 21 extends from the top of head 12 to valve 14.

A substantially conventional carburetor 22 is mounted on head 12 and connected to said intake manifold in the usual manner. A conventional throttle 23 and venturi 24 are located in the air passage 25, together with the usual choke means 26. The float chamber 27 mounted on the side of passage 25 contains the usual float and needle valve assembly (not shown) for maintaining the chamber full of fuel to the usual level 28. Fuel is supplied to the carburetor through the fuel line 29 by fuel pump means of any conventional type (not shown).

Fuel is supplied to the engine not only by the carburetor 22, but also by means of the injector 30 which is located in head 12 and extends into manifold 21 at a point adjacent valve 14. This injector is of the type which is mechanically operated, and in a multiple cylinder engine, there is one injector for each cylinder. The injectors, in case there is more than one, are all supplied with fuel by a common line 31 in the manner of the "common rail system" sometimes employed in diesel engines. The injector is operated by lever 32 mounted on cross-shaft 40, and lever 32 engages a collar 33 on intake valve stem 34. When the intake valve is near its full open position as shown, the lever 32 is depressed and lifts valve 35 inside the injector and allows liquid fuel to flow through nozzle 36. Nozzle 36 is oriented so that its fuel stream 37 passes through the open valve and impinges first at point 38a on the upper wall of passage 19 of the ignition chamber, then is deflected downwardly and impinges at points 38 on the bottom wall of said passage 19. The initial impingement at point 38a tends to break up the liquid fuel stream 37, and form a fan-shaped spray which spreads the fuel widely over the bottom wall of passage 19 as indicated by reference line 38. When small quantities of fuel are injected, the fuel may simply wet the surface at point 38a and be vaporized by air entering the ignition chamber during the compression cycle and when more is injected, some of the fuel that is sprayed may vaporize in the air before it impinges on the lower passage wall at 38. Nozzle 36 is usually a non-atomizing type, but may also be an atomizing type which delivers the fuel in a fan-shaped spray which also passes through the open valve and enters passage 19. This injected fuel does not enter the engine cylinder, but is localized in the ignition chamber passage until vaporized and swept into the ignition chamber during the compression cycle.

Engines of the type having dual fuel supply means form a generally stoichiometric fuel-air mixture in the ignition chamber, and a lean fuel-air mixture in the main combustion chamber. In this engine the fuel-air mixture in the ignition chamber is produced by combining, in the ignition chamber, fuel supplied by both the carburetor 22 and the injector 30. The portion of the carbureted charge supplied to the main combustion chamber that is compressed into the ignition chamber during the compression cycle is enriched by the injected fuel to bring the fuel-air ratio up to the spark ignitable proportions. The operation of an engine of this class has already been described in a copending application Serial No. 278,383 filed May 6, 1963, entitled Excess Air Cycle Engine, already referred to. As therein described, the engine operates with full unthrottled air at all times, and idles with combustion only in the localized fuel-air charge in the ignition chamber. Maximum thermal efficiency is obtained under these conditions, but, unfortunately, the flame is cooled and partially quenched before completion by the large volume of excess air, and products of partial combustion are exhausted. In order to eliminate these completely, a combustion process is described herein which correlates charge density and excess air in such a way as to give a completely odorless, smog-free combustion. This is attained, however, at some sacrifice in thermal efficiency due to losses incurred when throttling the charge.

The basic combustion cycle employed herein is substantially the same as that described in our copending application Serial No. 283,089 filed May 24, 1963, and entitled Dual Fuel Supply Means for Excess Air Cycle Engine, but the means for control are different, and there are some variations in the cycle itself. These control means will now be described.

Carburetor 22 has a standard main fuel jet 39 (not shown in detail) and two orifices 41 and 42 which, when both are open, supply fuel for operation as a standard gasoline engine. When orifice 42 is closed by valve 43, the mixture supplied by the carburetor is lean over its entire range. The idle system (not shown) is also adjusted lean to match the main jet. A standard type of pressure regulator 44 is shown attached to the float chamber, and fuel is supplied to said regulator by a branch line 45 from fuel pump means (not shown). The fuel line 31 connects the output side of the regulator to injector 30, and if there is more than one, the line also connects to the others. A spring 47, on diaphragm 48, acts, when compressed, to open valve 49 and increase the fuel pressure in the regulator. The spring pressure is controlled by two diaphragms 50 and 51, acting through levers 52 and 53 on spring 47. The underside of diaphragm 50 is connected by tube 55 to intake manifold 21 at a point below throttle 23, and the underside of diaphragm 51 is connected by tube 56 to the low pressure point of venturi 24. Low pressure in tube 55 acts to reduce spring pressure, while low pressure in tube 56 acts to increase spring pressure by the arrangement of levers 52 and 53 which operate as follows: Lever 52 is pivotally mounted on pivot 52a and connected by rod 52b to diaphragm 51. Similarly lever 53 is pivotally mounted on pivot 53a and connected by rod 53b to diaphragm 50. When diaphragm 50 moves to the left, due to a vacuum in manifold 21, rod 53b pulls lever 53 and reduces pressure on spring 47. When diaphragm 51 moves to the left due to low pressure in tube 56 (caused by high air velocity through venturi 24), rod 52b pulls lever 52 and engages lever 53 at point 52c. This moves the upper end of lever 53 to the right, and compresses spring 47.

For all operation, except full load (described later), the carburetor 22 supplies the engine with a lean fuel mixture, and injector 30 supplies enough additional fuel to the ignition chamber to make the mixture therein stoichiometric. The quantity of fuel injected is proportional to the density of the fuel mixture supplied by the carburetor to the intake manifold. Diaphragm 50 is responsive to pressure changes in the intake manifold, and acts to reduce the pressure of the fuel supplied to injector 30 when the manifold pressure is low and vice versa. The "common rail" fuel injection system shown has injectors in which the open time of the injector is a function of crank angle only, and therefore, at high engine speeds, less fuel is injected per cycle than at low speeds, for a given fuel pressure and a speed correction is necessary. To compensate for engine speed, the fuel pressure is increased in proportion to engine speed. This is done by diaphragm 51, which is responsive to air velocity through venturi 24. As air velocity increases with engine speed, pressure in line 56 drops and diaphragm 51 acts through levers 52 and 53 to increase the fuel pressure in regulator 44. The two diaphragms acting together adjust the fuel pressure to match both engine speed and charge density. It is evident that the function of diaphragm 51 could be replaced with a mechanical governor or equivalent. This relation covers the entire engine operation except full load, when the normal stoichiometric fuel-air mixture is supplied to both the main combustion chamber and the ignition chamber. For full load operation, all fuel to injector 30 is cut off, and valve 43 is opened. This is done by rod 57 which lifts valve 43 and rod 58 which lifts lever 53. This reduces spring pressure on the regulator and the fuel pressure is reduced to a very low value. Rods 57 and 58 are actuated by levers 59 and 60, respectively. These levers are mounted on throttle shaft 61 so this action takes place when throttle 23 is opened wide and the carburetor functions in its standard manner. With the arrangement shown the engine operates at all times, except full load, with sufficient excess air to clean up the combustion and produce a clean, odorless exhaust. There is not enough excess air to interfere with the burning process and cool the flame to the quenching point, or, in the case of poor charge localization, to produce a lean, slow burning hot charge that forms nitrous oxides.

The engine may be operated with a minimum of excess air, such that, in the event the auxiliary fuel injection system fails to function, the engine will still perform almost normally on the carburetor alone. However, the greater the proportion of excess air (up to the point of excess cooling), the greater the ability the engine has to operate with clean combustion during all types of engine operation, such as acceleration, deceleration, and idling and with a carburetor that is improperly adjusted or designed. Excess air, properly applied, has a great ability to "cover up" defects in the fuel supply system, which makes the engine much less critical to maintain in a non-smog producing manner, and it also increases the thermal efficiency above that of the standard gasoline engine.

It is understood that the "common rail" fuel injection system is only a particular way of supplying the auxiliary fuel to the engine. It is particularly adaptable to multiple cylinder engines, but for single cylinder engines, or for other reasons, it may be desirable to use individual fuel pumps for each cylinder, or a pump with a fuel distributor to individual cylinders. It is only necessary to replace the injector 30 with any standard type of injector, and connect the output control of the pump to a diaphragm that is responsive to charge density in the intake manifold. This is shown diagrammatically in FIG. 3. A carburetor 62, adjusted lean as already described, is connected by an intake manifold 63 to the intake valve port 64. A standard fuel pump 65 is connected by fuel line 66 to a standard injector 67 which is adapted to inject through the open valve port during the intake cycle of said engine, although direct injection into the ignition chamber may be used if desired. A diaphragm 68 is connected to the output control of said pump by rod 69 and a tube 70 connects said diaphragm to said intake manifold. When manifold pressure is low, the pump output is reduced to match the low density fuel charge. At full load, the pump output is cut off and the carburetor fuel mixture restored to normal by the lever means already described, or the equivalent.

If in FIG. 3, the fuel pump is of the type which has a single pump pumping into a rotary disc type fuel distributor, or the equivalent, which delivers the fuel to the individual cylinders from a single source, it is evident that the single pump may be replaced by the fuel output from the pressure regulator 44 (FIG. 1). The ports in any standard type of distributor act to interrupt the flow of fuel to individual cylinders, and deliver only to each one in sequence, so that if the distributor is supplied with fuel under a steady but controlled pressure, it will deliver the fuel to the individual cylinders in timed and individual pulses in a manner equivalent to that of the mechanically operated injectors 30 (in a multiple cylinder engine) on a "common rail" fuel line. The open time of the individual distributor ports must coincide with the full-open time of the respective intake valves as already described.

The engine, as shown, is supplied with a mixture of substantially uniform leanness by carburetor 22 over the entire load range except full load. In order to obtain a higher thermal efficiency at part load, it is desirable to vary the degree of leanness as a function of load, and thereby duplicate the method of operation described in copending application Dual Fuel Supply Means for Excess Air Cycle Engine, Serial No. 283,089 filed May 24, 1963. The means employed in this disclosure are different from those of the copending application in two distinct ways. First, the dual fuel supply consists of a carbureted charge and separate liquid fuel injection in place of two carbureted charges, and, secondly, the excess air is obtained by varying the fuel supplied to the carburetor jets instead of supplying excess air through a by-pass passage. The final results obtained are, however, substantially identical.

The means for obtaining the variation in leanness are shown in the carburetor in FIG. 4. This carburetor is substantially identical to that shown in FIG. 1, but only the new parts added are shown for the sake of clarity and simplicity, and alternate means, consisting of a metering pin 82 and seat 83, are shown in place of the pressure regulator 44 for controlling the fuel delivery to injector 30. Use is made of the same control means responsive to manifold vacuum and air flow, acting through levers 52 and 53. Metering pin 82 is attached to the end of lever 53, and moves in a seat 83, and fuel lines 45 and 31 lead up to and away from this valve instead of to the pressure regulator. When lever 53 moves metering pin 82 to the left (as when compressing spring 47), it opens to allow more fuel to flow, similar to its action of building up fuel pressure in the regulator.

To obtain the variation in leanness desired, a mechanism is provided which simultaneously varies the fuel supplied by the carburetor and the injector in such a way that as one increases in amount the other decreases correspondingly, and the sum of both, in the ignition chamber, remains constant. A cam 71 is fixed to throttle shaft 61 and engages a bell crank 72 mounted on pivot 73. This crank in turn engages a second bell crank 74 mounted on pivot 75 and the second crank compresses a spring 76 which acts against lever 53. A rod 77 is pivotally connected to crank 74 and to a rocker arm 78 pivoted at 79. This rocker arm is pivotally connected to a metering pin 80 which slides in orifice 41.

When cam 71 is turned as shown with its nose 81 against crank 72, spring 76 is compressed, and this acts to move the metering pin 82 to the left and deliver more fuel than it would otherwise do by the action of diaphragms 50 and 51 alone. Simultaneously metering pin 80 has restricted the flow of fuel through jet 39 and made the carbureted mixture leaner. These two functions are coordinated so that the ignition chamber still receives a stoichiometric fuel-air mixture, but the main charge contains more excess air. The cam can change the degree of leanness of the charge without interfering with the engine speed and charge density control already described.

The cam is set on the throttle rod 61 so that at idle load there is no change from the original operation, but as load is increased, the carbureted mixture becomes leaner until about the one-quarter or one-third load point is reached. Thereafter, the mixture is gradually made richer again until it becomes stoichiometric at full load. This improves the thermal efficiency of the engine and combustion remains odorless if the point of flame quenching from too much excess air is not reached.

An additional change may be made. If the throttle 23 and its associated passage is made oversize for a normal carburetor, so that it offers no flow restriction when only opened half way, then the last half of its motion will not affect air density. Cam 71 may be set, however, to restrict the flow of fuel so that the engine operates at full charge density but with excess air from about one-half load to nearly full load. At full load the mechanism already described turns on full fuel to produce a stoichiometric mixture. This method of operation gives the maximum thermal efficiency compatible with odorless exhaust, and by changing the contour of cam 71, any desirable variation of excess air versus engine load may be obtained.

The size of the ignition chamber relative to the combustion chamber may vary widely. When the engine is designed to operate at all times on a full, unthrottled air charge, including idling, the ignition chamber must be small enough to limit the power output of the combustion in the ignition chamber to only enough to idle the engine. When the air is throttled to some degree, the ignition chamber volume may be made larger, and may have any size relative to the main combustion chamber. The larger the ignition chamber becomes, the greater its ability to ignite and burn a lean mixture in the main combustion chamber. Ultimately it becomes possible to obtain clean combustion with only air in the main combustion chamber at part load. Under these circumstances, the operation of the engine falls into two distinct phases. In the initial phase, the engine operates from idle to full charge density on the ignition chamber alone, with throttled air control. The larger the ignition chamber, the more power the engine will develop on this phase. When full air density is reached, then additional power is obtained by supplying fuel to the main chamber. Since idling is the most critical condition for obtaining odorless exhaust, this operation may be modified to idle with some fuel in the main combustion chamber to assist spread of flame through the entire chamber. Above idle, this is no longer necessary and then the remainder of the first phase may take place with air only in the main chamber.

Any of the above modes of operation or variations thereof may be obtained with the mechanism of FIG. 4. It is only necessary to shape cam 71 so that valve 80 closes orifice 41 during the first phase operation. If some fuel is desired during idling, this can also be supplied by shaping cam 71 to open orifice 41 at that time.

The fuel supply means described herein have used a carburetor for supplying the main fuel charge, but the methods of operation are not limited to the use of a carburetor. Other fuel supply means, such as an injection pump may be used in combination with means (such as a throttle) for varying the air charge density as a function of engine load. The substitution of a fuel pump and throttle, of the type which duplicates the action of a standard carburetor for the carburetor shown requires no explanation. But if the engine shown in FIGS. 1 and 2 is supplied with fuel from a fuel pump with timed injection to supply fuel for the main charge, in combination with a throttle to vary the air density, then the main fuel charge may be varied, not only in density, but in the degree of charge stratification in the cylinder and main combustion chamber.

A diagrammatic view of an engine of this type is shown in FIG. 5. A fuel pump 84 is connected by fuel line 85 to injector 86 which is adapted to inject fuel through intake valve port 87 during the intake cycle of said engine. A throttle 88 in manifold 89 controls the flow of air to said engine. The output of the pump 84 is controlled by diaphragm unit 90 which is connected to manifold 89 below throttle 88 by line 91. The output of pump 84 is controlled by diaphragm unit 90 which is connected to manifold 89 below throttle 88 by line 91. The output of pump 84 is controlled by air density. A second pump 92 is connected by fuel line 93 to injector 94 in manifold 89 preferably near to the inlet port 87. The pump output is controlled by rod 95 connected to throttle 88. This is a simple fuel control system. It is evident that the type of cam control shown in FIG. 4 could also be applied to this pump type fuel supply system if desired. The distinguishing feature of this fuel supply system is that the main fuel charge may be injected in timed relation to the intake cycle, and the fuel supplied to the main combustion chamber may be injected in a short period of time less than the intake stroke of the engine. The fuel will then be admitted to the engine as a stratified charge in the air body. A localized body of fuel is somewhat easier to ignite and burns more quickly than a lean, homogeneous fuel-air mixture.

If the timing is such that the localized fuel body is not compressed, wholly or in part, into the ignition chamber during the compression cycle, then the fuel for the ignition charge must all be injected by pump 84. On the other hand, if the charge does enter the ignition chamber, then a suitable reduction in fuel injection by pump 84 must be made.

It will be evident that many variations may be made, not only in fuel control and fuel supply means, but also in the design of the engine and its ignition chamber. This chamber does not need to be a distinctly separate chamber connected to the cylinder through a restricted passage, but may simply be an extension or integral part of the main combustion chamber. It is only required that air circulation during the intake and compression cycles does not intermingle the ignition charge with the main fuel charge or excess air prior to ignition.

It is also understood that the invention is not limited to the precise structures shown and described, but also includes such modifications as may be embraced within the scope of the appended claims.

We claim:

1. In an internal combustion engine having a piston and cylinder and fuel supply means, the combination of: a combustion chamber in communication with said cylinder, an ignition chamber in communication with said combustion chamber, an intake valve in communication with said combustion chamber and positioned adjacent said ignition chamber, an intake manifold in conjunction with said intake valve, a liquid fuel injector in said intake manifold adjacent said intake valve and adapted to deliver liquid fuel to said ignition chamber through said intake valve when said valve is open, and actuating means linking said injector and said intake valve whereby the opening movement of said valve acts to open said injector and allow fuel to flow from said injector only while said intake valve is open.

2. In an internal combustion engine having a piston and cylinder and fuel supply means, the combination of: a combustion chamber in communication with said cylinder, an ignition chamber in communication with said combustion chamber, an intake valve communicating with said combustion chamber and positioned adjacent said ignition chamber, an intake manifold in conjunction with said intake valve, a liquid fuel injector having valve means for liquid fuel flow control positioned in said intake manifold adjacent said intake valve and adapted to deliver liquid fuel to said ignition chamber through said intake valve in pulses regulated by said valve means which are open for a substantially fixed portion of the open time of said intake valve, and fuel supply means which deliver liquid fuel under controlled pressure to said valve means.

3. In an internal combustion engine having a piston and cylinder and fuel supply means, the combination of: a combustion chamber in communication with said cylinder, an ignition chamber in communication with said combustion chamber, an intake valve communicating with said combustion chamber and positioned adjacent said ignition chamber, an intake manifold in conjunction with said intake valve, a liquid fuel injector having valve means for liquid fuel flow control positioned in said intake manifold adjacent said intake valve and adapted to deliver liquid fuel to said ignition chamber through said intake valve in pulses regulated by said valve means which are open for a substantially fixed portion of the open time of said intake valve, and fuel supply means responsive to engine speed which deliver liquid fuel to said valve means and increase the fuel pressure at high speed and decrease the fuel pressure at low speed.

4. In an internal combustion engine having a piston and cylinder and fuel supply means, the combination of: a combustion chamber in communication with said cylinder, an ignition chamber in communication with said combustion chamber, an intake valve in communication with said combustion chamber and positioned adjacent said ignition chamber, an intake manifold in conjunction with said intake valve, a liquid fuel injector having valve means for liquid fuel flow control positioned in said intake manifold adjacent said intake valve and adapted to deliver liquid fuel to said ignition chamber through said intake valve in pulses regulated by said valve means which are open for a substantially fixed portion of the open time of said intake valve, and fuel supply means responsive to air velocity in said intake manifold which deliver liquid fuel to said valve means and increase the fuel pressure at high air velocity and decrease the pressure at low air velocity.

5. In an internal combustion engine having a piston and cylinder and fuel supply means, the combination of: a combustion chamber in communication with said cylinder, an ignition chamber in communication with said combustion chamber, an intake valve in communication with said combustion chamber and positioned adjacent said ignition chamber, an intake manifold in conjunction with said intake valve, a liquid fuel injector having valve means for liquid fuel flow control positioned in said intake manifold adjacent said intake valve and adapted to deliver liquid fuel to said ignition chamber through said intake valve in pulses regulated by said valve means which are open for a substantially fixed portion of the open time of said intake valve, and fuel supply means responsive to engine speed and which include a fuel pressure regulator which deliver liquid fuel to said valve means and deliver said fuel at high pressure at high engine speed and at low pressure at low engine speed.

6. In an internal combustion engine having a piston and cylinder and fuel supply means, the combination of: a combustion chamber in communication with said cylinder, an ignition chamber in communication with said combustion chamber, an intake valve in communication with said combustion chamber and positioned adjacent said ignition chamber, an intake manifold in conjunction with said intake valve, a liquid fuel injector having valve means for liquid fuel flow control positioned in said intake manifold adjacent said intake valve and adapted to deliver liquid fuel to said ignition chamber through said intake valve in pulses regulated by said valve means which are open for a substantially fixed portion of the open time of said intake valve, and fuel supply means responsive to engine speed and which include a metering pin to control the flow of fuel which deliver liquid fuel to said valve means and deliver said fuel at high pressure at high engine speed and at low pressure at low engine speed.

7. In an internal combustion engine having a piston and cylinder and fuel supply means, the combination of: a combustion chamber in communication with said cylinder, an ignition chamber in communication with said combustion chamber, an intake valve communicating with said combustion chamber, an intake manifold in conjunction with said intake valve, fuel supply means for delivering fuel to said ignition chamber, air density control means in said intake manifold, and means responsive to air density in said manifold for controlling the quantity of fuel delivered to said ignition chamber.

8. In an internal combustion engine having dual fuel supply means for an ignition chamber and a main combustion chamber of said engine and an intake manifold in communication with said combustion chamber, the combination of: a carburetor, having fuel delivery jets, in communication with said intake manifold, a separate fuel supply means for said ignition chamber, fuel flow restriction means in combination with the fuel delivery jets in said carburetor whereby the fuel-air mixture delivered by said carburetor may be made leaner than substantially stoichiometric, fuel flow control means in combination with said separate fuel supply means, means in combination with said fuel flow restrictive means in said carburetor and fuel flow control means associated with said separate fuel supply means whereby when one fuel flow is decreased the other is increased, and vice versa, and control means in combination with both fuel supply means whereby at full engine load the fuel flow restriction is removed and said carburetor delivers a stoichiometric fuel-air mixture to both said chambers and said fuel flow control means for said separate fuel supply means cuts off all fuel delivery to said ignition chamber.

9. In an internal combustion engine having a piston and cylinder and fuel supply means, the combination of: a combustion chamber in communication with said cylinder, an ignition chamber in communication with said combustion chamber, an intake valve in communication with said combustion chamber, an intake manifold in conjunction with said intake valve, fuel supply means for delivering fuel to said ignition chamber, air density control means in said intake manifold, and means responsive to air density in said manifold for increasing fuel delivery to said ignition chamber at high air density and decreasing fuel delivery to said chamber at low air density.

10. In an internal combustion engine having dual fuel supply means for an ignition chamber and a main combustion chamber of said engine, and an intake manifold in communication with said combustion chamber, the combination of: a carburetor, having fuel delivery jets, in communication with said intake manifold, a separate fuel supply means for said ignition chamber, fuel flow restriction means in combination with the fuel delivery jets in said carburetor for making the fuel-air mixture delivered by said carburetor leaner than substantially stoichiometric, fuel flow control means in combination with said separate fuel supply means, and means in combination with said fuel flow restrictive means in said carburetor and fuel flow control means associated with said separate fuel supply means for decreasing one fuel flow when the other is increased, and vice versa.

11. In an internal combustion engine having dual fuel supply means for an ignition chamber and a main combustion chamber of said engine, and an intake manifold in communication with said combustion chamber, the combination of: a carburetor, having fuel delivery means and a throttle, in communication with said intake manifold, a separate fuel supply means for said ignition chamber, fuel flow restriction means in combination with the fuel delivery means in said carburetor for making the fuel-air mixture delivered by said carburetor leaner than substantially stoichiometric, fuel flow control means in combination with said separate fuel supply means, means in combination with said fuel flow restrictive means in said carburetor and fuel flow control means associated with said separate fuel supply means for decreasing one fuel flow when the other is increased, and vice versa, and control means associated with the throttle of said carburetor whereby the said changes in fuel flow may be varied as a function of throttle position.

12. In an internal combustion engine having dual fuel supply means for an ignition chamber and a main combustion chamber of said engine, and an intake manifold in communication with said combustion chamber through an intake valve, the combination of: a first fuel supply means for said ignition chamber, a second fuel supply means for said intake manifold in the vicinity of said intake valve, means for timing the delivery of fuel from said second fuel supply means to said intake manifold in synchronism with the opening of said intake valve and in variable pulses of duration less than the open time of said valve, a throttle in said intake manifold for varying the air density, and means for coordinating the air density in said intake manifold and the duration of fuel delivery to said intake manifold such that fuel is delivered in short pulses at low air density and in long pulses at high air density.

13. In an internal combustion engine having a piston and cylinder and fuel supply means, and a cylinder head of substantially conventional valve-in-head design, the combination of: an intake valve in said cylinder head above said piston with the valve stem inclined at an angle to the cylinder bore and oriented such that the valve head has its edge nearest the cylinder wall raised above the piston more than its edge near the center of the cylinder forming a wedge-shaped combustion space above the piston, an ignition chamber offset from said cylinder bore and opening into said combustion space near the raised edge of said intake valve, an intake manifold in conjunction with said intake valve, and fuel injection means in said intake manifold adjacent said intake valve oriented to inject fuel through said intake valve when in its open position, directly into said ignition chamber.

14. In an internal combustion engine of the type having a main combustion chamber and an ignition chamber, the method of operation with excess air to minimize emission of incompletely oxidized fuel, which includes as steps: supplying both the main combustion chamber and the ignition chamber with a fuel-air mixture containing a small excess of air above stoichiometric proportions from no load to nearly full load with variable mixture density engine power control, independently supplying a small quantity of fuel to said ignition chamber to increase the fuel-air mixture in said ignition chamber to substantially stoichiometric proportions at all mixture densities except full load, and supplying both the main combustion chamber and the ignition chamber with a substantially stoichiometric fuel-air mixture at full load without the additional addition of fuel to the ignition chamber.

15. In the operation of an internal combustion engine of the type having a main combustion chamber and an ignition chamber, the method of controlling the fuel-air ratio of the fuel mixture in said chambers at variable engine speed and load, which includes as steps: supplying both the main combustion chamber and the ignition chamber with a fuel-air mixture containing some excess air above stoichiometric proportions, from no load to nearly full load with variable mixture density engine power control, and independently supplying a small quantity of fuel to said ignition chamber to increase the fuel-air mixture in said chamber to substantially stoichiometric proportions by adding fuel in direct proportion to the fuel-air mixture density.

16. In an internal combustion engine of the type having a main combustion chamber and an ignition chamber and dual fuel supply means, including a "common rail" type of injection system utilizing a mechanically operated fuel flow control valve and a source of fuel under pressure, the method of controlling the fuel-air ratio of the fuel mixtures in said chambers at variable speed and load, which includes as steps: supplying both the main combustion chamber and the ignition chamber with a fuel-air mixture containing some air in excess of stoichiometric proportions from no load to nearly full load with variable mixture density power control, independently supplying a small quantity of fuel to said ignition chamber to increase the fuel-air mixture in said chamber to substantially stoichiometric proportions by supplying said injector with fuel under pressure which varies in direct proportion both to the fuel-air mixture density and the engine speed.

17. In an internal combustion engine having a piston and cylinder and fuel supply means, the combination of: a combustion chamber in communication with said cylinder; an ignition chamber in communication with said combustion chamber; an intake valve communicating with said combustion chamber and positioned adjacent said ignition chamber; an intake manifold in conjunction with said intake valve; first liquid fuel supply means in said intake manifold adjacent said intake valve and adapted to deliver liquid fuel to said ignition chamber through said intake valve when said intake valve is open; second fuel supply means in conjunction with said intake manifold; air density control means in said intake manifold; and means responsive to air density in said manifold for controlling the quantity of fuel delivered to said ignition chamber.

References Cited in the file of this patent
UNITED STATES PATENTS

| | | |
|---|---|---|
| 2,058,487 | Mock | Oct. 27, 1936 |
| 2,426,740 | Mock | Sept. 2, 1947 |
| 2,435,659 | Summers | Feb. 10, 1948 |
| 2,534,346 | Fenney | Dec. 19, 1950 |
| 2,894,735 | Zupanic | July 14, 1959 |
| 2,977,947 | Carleton | Apr. 4, 1961 |
| 3,005,625 | Holley | Oct. 24, 1961 |